United States Patent [19]
Peddinghaus

[11] 3,881,589
[45] May 6, 1975

[54] INDEXING SYSTEM FOR SHEARS, PRESSES AND THE LIKE

[76] Inventor: Werner Peddinghaus, Bruchhausen 21, 4322 Sprockhovel-Hasslinghausen, Germany

[22] Filed: Sept. 7, 1971

[21] Appl. No.: 177,982

[30] Foreign Application Priority Data
Sept. 4, 1970  Germany................. 2043868

[52] U.S. Cl............................................. 198/127 R
[51] Int. Cl............................................. B23q 7/00
[58] Field of Search..... 198/127 R, 192 R; 226/105, 226/177; 83/420

[56] References Cited
UNITED STATES PATENTS

| 651,461 | 6/1900 | Jenkins | 198/127 R |
| 657,666 | 9/1900 | Melby | 198/127 R |
| 3,182,785 | 5/1965 | Tourtellette | 198/127 R |

FOREIGN PATENTS OR APPLICATIONS

| 1,258,621 | 6/1961 | France | 198/127 R |
| 1,456,513 | 3/1969 | Germany | 198/127 R |

*Primary Examiner*—Evon C. Blunk
*Assistant Examiner*—Douglas D. Watts
*Attorney, Agent, or Firm*—Walter Becker

[57] ABSTRACT

A feed arrangement for feeding workpieces along a path to a machine such as a shear or a press in which a support is provided on which rolls are mounted at least partially surrounding the path so as to engage different sides of the workpiece. At least one roll is driven and at least one roll opposed thereto is urged toward the driven roll so that the workpiece is gripped between the rolls. The support member on which the rolls are mounted also carries the drive motor for driving the driven roll and a fluid motor for urging the roll opposed to the drive roll toward the drive roll and with the support member being pivotally supported to swing away from the workpiece path to provide access to the tools of the machine.

14 Claims, 5 Drawing Figures

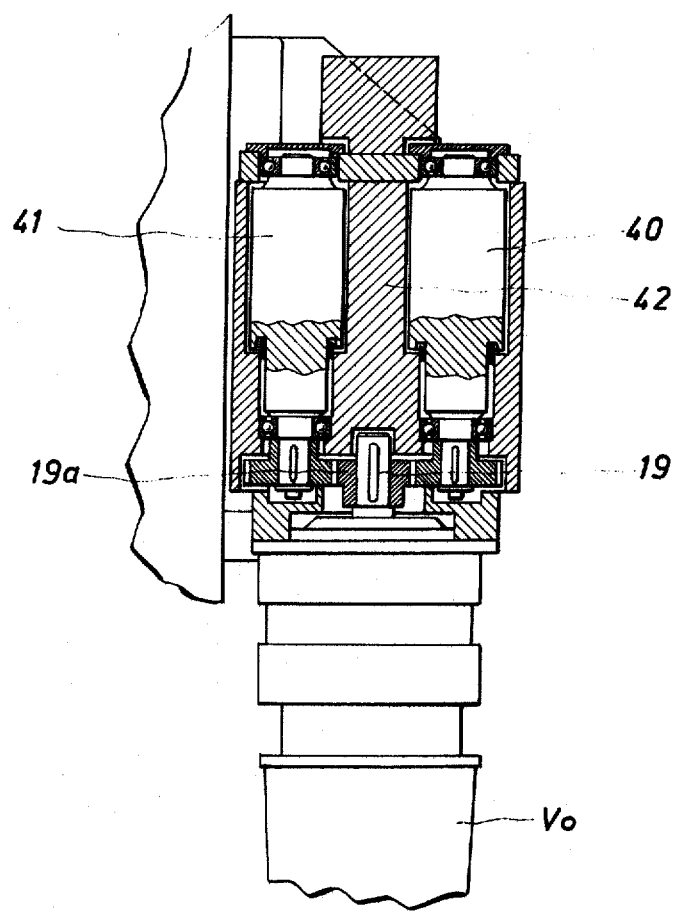

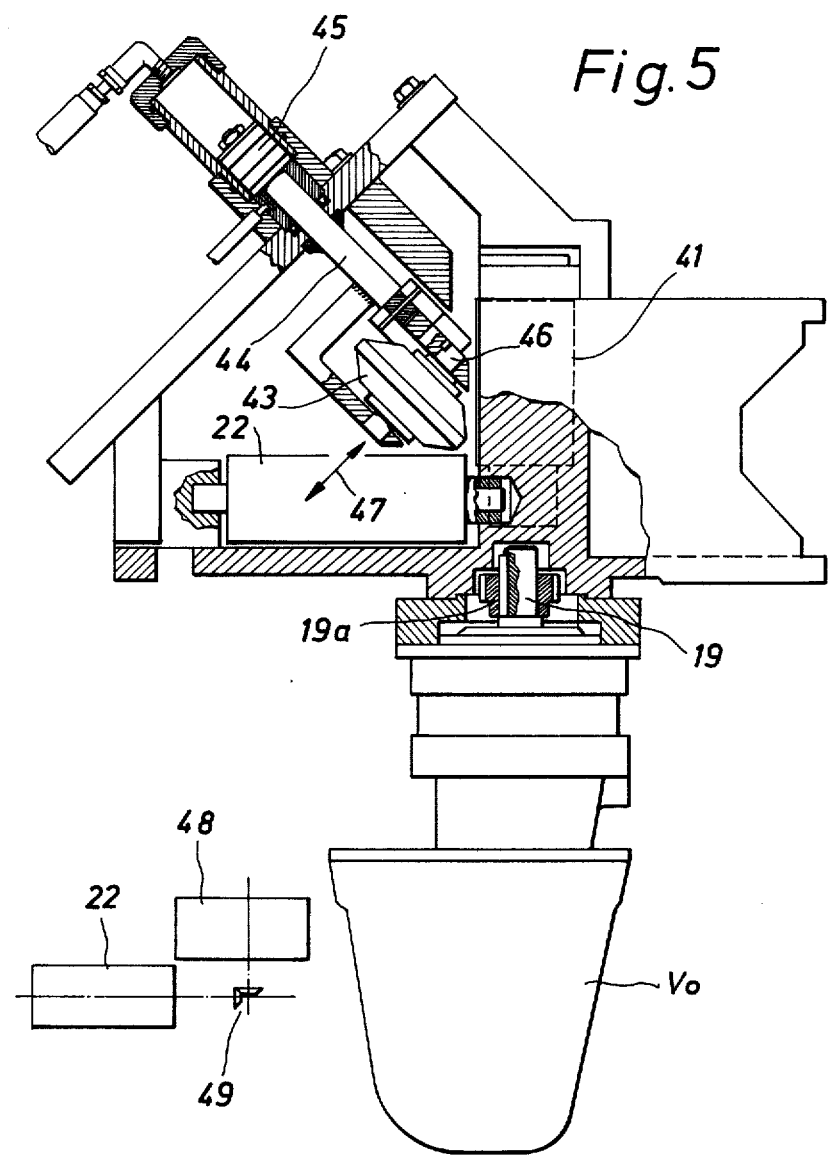

INDEXING SYSTEM FOR SHEARS, PRESSES AND THE LIKE

The present invention relates to an indexing system, especially for shears, presses and the like, which includes a horizontal support and two guideways defined by rolls. The invention also relates to saws and to such apparatus in which an advancing in increments of the material to be processed and, following this, the processing itself is carried out, i.e. the cutting, punching, pressing, sawing or the like.

In conventional feeding systems for shears, a horizontal support is employed in the form of a roller bed the rollers of which are driven in order to push the material to be processed through the shear mouth in engagement with an abutment behind this mouth. The spacing between the abutment and the shear mouth is equal to the length of the material advanced which is to be sheared off. The same applied to the punching of holes, for instance in the webs of I beam sections.

Both the advance movement of the conventional apparatus and the abutment means have various deficiencies inherent thereto. For instance the rollers of the roller bed on which the material to be processed rests must be driven for a quick and proper feeding of the material at a multiplicity of locations so that transmission means have to be provided for the rollers to be driven. Furthermore the accuracy of the length of the material to be sheared or the spacing of the holes to be punched is not always insured, in particular not in the event that the material to be sheared or punched has a substantial mass with which it impacts upon the abutment and as a result thereof is subjected to a certain recoiling effect.

It is an object of the present invention to provide an indexing system of the type referred to above which will overcome the disadvantages of the feeding system known heretofore for shears, presses or the like.

It is a further object of this invention to provide by simple means an advance movement which will permit very precisely to maintain the shearing length or the spacing of holes punched.

These and other objects and advantages of the invention will appear more clearly from the following specification in connection with the accompanying drawings, in which:

FIG. 3 shows a detail of the suspensions of the arrangement according to the invention.

FIGS. 4 and 5 illustrate a further embodiment of the invention, especially for L-shaped and U-shaped structural members.

Figure 1:
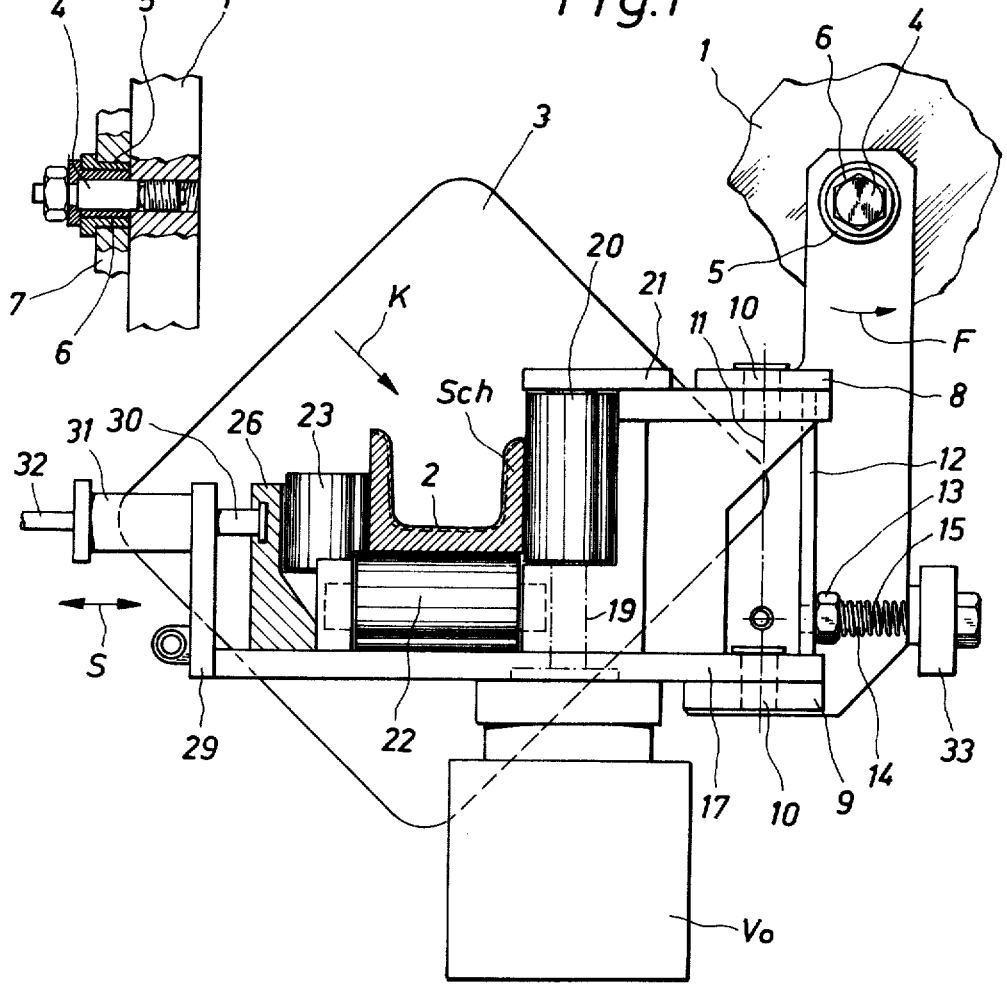
FIG. 1 is a front elevational view of an arrangement according to the present invention.

The indexing system according to the invention, especially for shears, presses or the like of the general type referred to above, is characterized primarily in that the one guide roll is driven by a feed motor which is controllable and which determines the feed length of the material to be processed, and that that guide roll disposed opposite to the first mentioned guide roll is urged by a pressure fluid cylinder against the material to be sheared, punched or the like.

The advantage of an indexing system according to this invention consists primarily in that transmission means associated to a large number of rollers of a roller bed or a support are dispensed with since the guide roll driven by the controllable feed motor in conjunction with its complementary roll urged in engagement by the pressure fluid cylinder insures a feeding even of extremely heavy-weight sections in a proper way. A further benefit of the indexing system of this invention is that a longitudinal abutment can be dispensed with, since the controllable feed motor itself determines the shearing length of the material or the spacing of the holes to be punched. Thus, the shearing and punching operation is much more advantageous, since the rate of feeding the material can be adjusted for shearing as well as for punching depending on the dimension and the weight of the material to be sheared or to be punched. The most devisive advantage must be considered to be, however, that, as has been indisputably proven by tests, a much higher accuracy of the desired shearing length or the spacing of the holed in the punching operation can be achieved in an unexpected way than is the case for conventional arrangements. By the momentary stopping of the controllable feed motor on the one hand and by the strong pressure engagement of the lateral complementary rolls with these rolls on the other hand a recoiling of the material to be sheared or punched is prevented as is the case with conventional arrangements using a longitudinal abutment.

According to a further development of the invention, guide and feed rolls are arranged at both sides of the material to be processed in a triangular form. This insures that in spite of the small number of rolls a precise guiding of the material to be sheared or punched into the shear mouth is effected. The rolls are provided in the corners of an isosceles triangle in this embodiment.

The feed motor according to the invention is an automatic feed motor which is arranged directly above or below the roll driven by it.

According to a still further development of the invention, the guide and feed rolls are pivotable in common with the feed motor and the pressure fluid cylinder about a vertical axis in the plane parallel to the feed direction of the material to be sheared, punched or the like. This feature insures an easy accessibility to the blades of the shears or to the punching dies of the press, only a pivoting out of the guide and feed rolls together with the motor and the pressure fluid cylinder being required for doing so. After a completed exchange of the blades or the dies, these parts can be pivoted back into their operative position and can be arrested there.

In addition to this feature, the guide and feed rolls may be arranged together with the feed motor and the pressure fluid cylinder as well as with the pivot axis for the parts indicated on a height-adjustable or laterally adjustable arm or a frame. The arm or the frame can in this regard be adjustable in height or laterally by an eccentric. In this way, the wear of the blades or the dies will be taken into consideration. When resharpened blades or reshaped dies are employed, the frame or the arm is given a lower position than is the case when using new blades or dies.

According to a still further development of the invention, the arm or the frame may be supported with a clearance and may be subjected to the thrust of a spring pushing or pulling the arm or the frame upwardly when the movable blade or the movable die is caused to move vertically. For shears having an upper knife or blade moved at 45° relative to a horizontal line, the arm or the frame is arranged pivotable laterally above or below the cutting direction of the movable upper knife, a spring acting upon the arm or the frame in or approximately in the direction of movement of the upper knife or blade.

A particularly advantageous embodiment of this invention contemplates a roll positioned at 45° or approximately 45° relative to the material to be sheared, said roll being adjustable by a pressure fluid in the angle between the two rolls or roll pairs disposed perpendicularly relative to one another. The roll may in this regard be freely shiftable in the direction of its axis so that the roll in the event of mass inaccuracies of the material to be fed will nevertheless engage the material in such a way that a precise feeding will be accomplished. In this regard the inclined roll is preferably formed with a double cone.

The described embodiment of the system has the additional advantage that the two rolls disposed at a right angle with regard to one another or the two roll pairs disposed at a right angle with regard to one another are driven in common for instance by means of a bevel gear or angle gear drive.

Referring now to the drawings in detail, a pin 4 (see also FIG. 3) is arranged on the shears frame 1 at the top right-hand side of the section opening 2 of the stationary blade or knife plate 3, as viewed in FIG. 1. On said pin or pivot 4 there are arranged two eccentric bushes 5, 6 carrying an arm 7. This depending arm, generally midway of its length, carries a horizontal plate-shaped projection 8 as well as at its lower end a likewise plate-shaped projection 9 parallel thereto. Both projections 8, 9 have bearing pins 10 passing therethrough and forming a vertical pivot axis 11.

The arm 7 is furthermore provided with a vertical strip 12 between the two projections 8, 9, said strip carrying a pin 14 secured by way of a nut. Said pin is capable of being screwed into the strip and serves to guide a spring 15.

Two web parts 16, 17 are commonly pivotable by means of the two pins 10, the lower web 17 having a greater length than the upper web 16. A block 18 extends between the two webs 16, 17, a shaft 19 passing through said block. This shaft is the drive shaft for a vertical guide and feed roll 20 the second bearing of which is defined by a lug 21 connected to the web 16. The shaft 19 is driven by an automatic feed motor Vo mounted underneath the web 17, said motor being supplied with a number of pulses corresponding to the advance movement of the material Sch to be sheared, either directly or via a controller in circuit therewith.

The block 18 at the same time defines the one bearing for a horizontal roll 22 which defines the abutment or support for the material Sch to be sheared. The second bearing of the roll 22 is defined by a further block 25 arranged between two rolls 23, 24. While the last mentioned block is firmly connected to the web 17, a further bearing part 26 is shiftable on the web 17 in the direction of the double arrow S (FIG. 1), this bearing part being guided by two guide rods 27, 28. Rods 27, 28 extend through a plate 29 connected to the web 17. By means of plate 29 the piston rod 30 engaging the bearing part 26 and pertaining to a pressure fluid cylinder 31 arranged on plate 29 is secured. Said cylinder is supplied with pressure fluid via a conduit 32. By means of said piston rod 30 the two rolls 23, 24 are able firmly to press the material to be sheared against the roll 20.

The spring 15 deviating only slightly out of the shearing direction K (FIGS. 1 and 2) of the movable upper knife or blade on the one hand abuts the nut 13, as mentioned hereinbefore, and the guide pin 14, and on the other hand it engages a stationary abutment 33 of the shears frame 1.

When the material Sch to be sheared is placed on the roll 22 and is urged against the roll 20 by means of the two rolls 23, 24, it assumes a position in which it is positioned about 1 mm above the stationary lower knife or blade of the shears. During the shearing operation, the upper knife urges the material to be sheared in the direction of the arrow K onto the lower knife, the rolls 20, 22, 23, 24 being able to deviate in the mentioned direction in that the arm 7 is capable of pivoting in the direction of the arrow F together with these rolls and the cylinder 31 as well as with the motor Vo about the pin 4 or the eccentric parts 5, 6. In doing so, the spring 15 is pressed together which after completing the shearing operation insures that the mentioned parts assume their original starting position again.

The controllable feed motor Vo defines an instantaneously effective brake in the system of this invention so that a precise shearing length or in a punching operation a precise spacing of the holes to be punched is accomplished. By causing the material to be sheared to pressure-engage the roll 20 by means of the rolls 23, 24 a later slipping of the material to be sheared is prevented even in case it has a large mass. In order to achieve a strong and uniform pressure engagement of the material to be sheared with the roll 20, the rolls 20, 23, 24 are arranged on an isosceles triangle.

Figure 2:
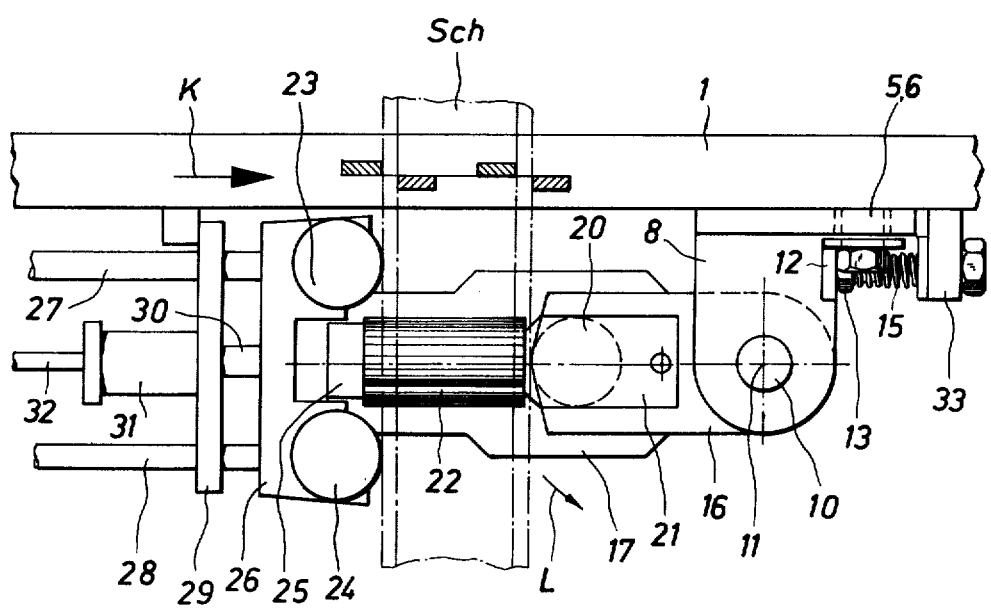
FIG. 2 is a plan view of the arrangement of FIG. 1 in its operative position.

For exchanging the knives of the shears or for pressing for exchanging the dies of the press, the system is pivoted in the direction of the arrow L out of the position illustrated in FIG. 2 about the axis 11 together with the two webs 16, 17.

In the event that the knives are worn or the dies are worn, the position of the rolls 20, 22, 23, 24 can be adjusted by the two eccentric bushes 5, 6.

In the embodiment of FIGS. 4 and 5, again a feed motor Vo is provided driving the shaft 19. Shaft 19 has mounted thereon a pinion 19a to rotate with said shaft. Pinion 19a drives two parallel guide rolls 40, 41 which are disposed perpendicular and define an intermediate space 42 between each other. A guide roll 43 adjustable to 45° is arranged opposite to the intermediate space, i.e. symmetrically opposite to the two rolls 40, 41. Said roll 43 is secured rotatable at the free end of a piston rod 44. Similar to the embodiment of FIGS. 1 to 3, again a lower roll 22 is provided on which L- and U-sections are supported. Said sections are preferably advanced by the system described above.

Since the piston 45 is adapted to be subjected to different pressures and inasmuch as the roll 43 directly engages the section part guided by the rolls 40, 41, small and thin-walled section lengths can be urged in engagement with the driven guide rolls at a corresponding pressure.

As illustrated in FIG. 5, the roll 43 coacting with the roll 22 and the roll pair 40, 41 is of a double-cone shape. It is supported by a shaft 46 on which it is shiftable in the direction of the double arrow 47 so that the roll 43, even in the event of mass inaccuracies of the material Sch to be sheared, either engages the part resting on the roll 22 or the part of the material to be sheared engaging the rolls 40, 41 or engages both parts and firmly urges the material to be sheared against the rolls 22, 40, 41 positioned normal relative to one another.

In a particularly advantageous manner a roll 48 may be provided instead of the two rolls 40, 41, said roll having a diameter which is at least twice as large as the roll width, the two rolls 22, 48 being driven in common for instance by a bevel gear drive 49.

It is, of course, to be understood that the present invention is, by no means, limited to the specific showing in the drawings but also comprises any modifications within the scope of the appended claims.

What is claimed is:

1. In a machine having a frame and elements to act on a work member, a device for feeding an elongated work member predetermined distances along a path to said elements, said device including a support member extending transversely across said path, means mounting said support member on said machine frame comprising pivot means for pivotally supporting said support member on said frame, roll means supported on said support member for supporting and guiding said work member including roll means on opposite sides of said work member in which at least two spaced rolls along one side of said work member guide said work member along said path to said elements of said machine, an adjustable speed-control motor supported on said support member, drive means connecting said motor to at least one of said roll means to advance the work member a predetermined distance, and pressure operable means supported on said support member to urge the roll means on one side of said work member against the roll means on the opposite side to guide said work member along said path, said pivot means having its pivot axis spaced from said path and mounting said support member with said roll means and said pressure operable means on said machine frame for pivotal movement of said support member out of said path to allow access to said machine elements.

2. A device in combination according to claim 1, in which pressure operable means includes a pressure medium cylinder mounted on said support member.

3. A feed arrangement according to claim 1 in which said one roll means is a single roll on one side of said path and said other roll means is a pair of rolls on the opposite side of said path on opposite sides of said single roll when viewed transversely to said path and said fluid operable means comprising a fluid motor mounted on said support member.

4. A feed arrangement according to claim 1 in which said one roll means is a single roll on one side of the path and said feed motor is arranged in axial alignment therewith.

5. A feed arrangement according to claim 1 in which said support member is adjustable on said frame in a direction angular to said path.

6. A feed arrangement for feeding elongated profiled work members along a path to a machine such as a shear or a press or the like for being operated therein; a frame, a support member on the frame extending transversely to said path, roll means rotatably supported on said support member including first, second, and third roll means distributed about said path for engaging angularly disposed sides of a workpiece to guide the workpiece along said path, a feed motor, drive means connecting said motor to at least one of said roll means in a direction to advance the workpiece, fluid operable means urging at least one other of said roll means which is opposed to said one roll means toward said one roll means, said feed motor and said fluid operable means being also supported on said support member, said support member being pivotally connected to said frame parallel to and on an axis spaced from said path whereby said support member together with said roll means and feed motor can be swung away from said path, and eccentric means connecting said support member to said frame for adjustment of the support member on the frame angularly to said path.

7. A feed arrangement according to claim 6 which includes spring means acting on said support member and urging the support member in one direction on said frame.

8. A feed arrangement according to claim 1 in which said other roll means is disposed with the axis of rotation thereof at an angle to the axis of rotation of said one roll means.

9. A feed arrangement according to claim 8 in which said angle is within the range of from about 30° to about 60°.

10. A feed arrangement according to claim 8 in which said other roll means is at least partially conical.

11. A feed arrangement according to claim 1 in which said one roll means comprises a pair of rolls spaced along said path on one side and said other roll means comprises a single roll on the opposite side of said path and disposed said pair of rolls when viewed in a direction lateral to said path.

12. A feed arrangement according to claim 8 in which said other roll means is adjustable in the direction of the axis thereof.

13. A feed arrangement according to claim 1 in which said feed motor is drivingly connected to angularly related ones of said roll means on respective sides of said path, the other of said roll means on another side of said path being angularly related to the driven ones of said roll means and being urged toward said driven roll means by said fluid operable means.

14. A feed arrangement according to claim 1 in which said path is horizontal and said support member extends horizontally beneath said path, a vertical arm at one end of said support member and connected to said frame, and vertical pivot axis means pivotally connecting said one end of said support member to said vertical arm.

* * * * *